US010344813B2

(12) United States Patent
Kimura et al.

(10) Patent No.: US 10,344,813 B2
(45) Date of Patent: Jul. 9, 2019

(54) BRAKE ACTUATOR AND BRAKE APPARATUS

(71) Applicants: Mitsuba Corporation, Gunma (JP); Akebono Brake Industry Co., Ltd., Chuo-ku, Tokyo (JP)

(72) Inventors: Ryosuke Kimura, Gunma (JP); Takeshi Kuroki, Tokyo (JP); Hiroyuki Kato, Tokyo (JP); Michio Suzuki, Tokyo (JP)

(73) Assignees: Mitsuba Corporation, Kiryu-shi, Gunma (JP); Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 15/550,899

(22) PCT Filed: Dec. 10, 2015

(86) PCT No.: PCT/JP2015/084668
§ 371 (c)(1),
(2) Date: Aug. 14, 2017

(87) PCT Pub. No.: WO2016/132633
PCT Pub. Date: Aug. 25, 2016

(65) Prior Publication Data
US 2018/0045258 A1 Feb. 15, 2018

(30) Foreign Application Priority Data

Feb. 16, 2015 (JP) .................................. 2015-027091

(51) Int. Cl.
*F16D 55/22* (2006.01)
*F16D 65/02* (2006.01)
(Continued)

(52) U.S. Cl.
CPC ............. *F16D 65/02* (2013.01); *F16D 55/22* (2013.01); *F16D 65/0068* (2013.01); *F16D 65/18* (2013.01); *F16D 2121/24* (2013.01)

(58) Field of Classification Search
CPC ...... F16D 65/18; F16D 2121/24; F16D 55/22; F16D 2125/50; F16D 65/02
(Continued)

(56) References Cited

U.S. PATENT DOCUMENTS

| 5,107,967 A | 4/1992 | Fujita et al. |
| 5,819,884 A * | 10/1998 | Giering ................. F16C 19/502 188/71.9 |

(Continued)

FOREIGN PATENT DOCUMENTS

| DE | 4021572 A1 | 1/1991 | |
| DE | 102008030535 A1 * | 12/2009 | ............ B60T 13/741 |

(Continued)

OTHER PUBLICATIONS

International Search Report for PCT Serial No. PCT/JP2015/084668 dated Feb. 4, 2016.
(Continued)

*Primary Examiner* — Bradley T King
*Assistant Examiner* — Mahbubur Rashid
(74) *Attorney, Agent, or Firm* — McCormick, Paulding & Huber LLP

(57) ABSTRACT

A support portion (23) has three screw insertion portions (23*d*1, 23*d*2, and 23*d*3) which is fixed to a caliper, and arranged so as to surround an output shaft (39). Therefore, it is possible to firmly fix a case (21) to the caliper at these fixing locations. Additionally, since the fixing locations are determined so as to collectively define a "plane", it is possible to effectively inhibit a sway of the case (21) with respect to the caliper. Furthermore, it is possible to inhibit a
(Continued)

twist of the case (21), and it is possible to sufficiently support a vehicle requiring large torque such as a truck.

14 Claims, 7 Drawing Sheets

(51) Int. Cl.
  *F16D 65/18* (2006.01)
  *F16D 65/00* (2006.01)
  *F16D 121/24* (2012.01)
(58) Field of Classification Search
  USPC ...................................................... 188/73.31
  See application file for complete search history.

(56) References Cited

U.S. PATENT DOCUMENTS

| | | | | |
|---|---|---|---|---|
| 6,112,864 A | * | 9/2000 | Suzuki | F16D 55/22655 188/158 |
| 6,854,572 B2 | * | 2/2005 | Usui | B60T 13/741 188/156 |
| 7,395,905 B2 | * | 7/2008 | Solignat | F16D 65/18 188/162 |
| 8,051,957 B2 | * | 11/2011 | Giering | B60T 13/741 188/72.8 |
| 2004/0195058 A1 | * | 10/2004 | Ina | F16D 65/18 188/158 |
| 2006/0090970 A1 | * | 5/2006 | Solignat | F16D 65/0043 188/162 |
| 2007/0158148 A1 | * | 7/2007 | Ohtani | F16D 65/18 188/158 |
| 2007/0209888 A1 | * | 9/2007 | Adachi | F16D 65/18 188/72.7 |
| 2007/0227838 A1 | * | 10/2007 | Shigeta | F16D 65/18 188/72.7 |
| 2007/0267255 A1 | * | 11/2007 | Inagaki | B60T 8/4872 188/72.4 |
| 2007/0278052 A1 | * | 12/2007 | Inagaki | F16D 65/18 188/151 R |
| 2008/0264735 A1 | * | 10/2008 | Matsushita | B60T 13/746 188/68 |
| 2009/0283371 A1 | * | 11/2009 | Winkler | F16D 65/18 188/72.6 |
| 2010/0084230 A1 | * | 4/2010 | Yamasaki | F16D 65/18 188/162 |
| 2011/0247904 A1 | * | 10/2011 | Yamasaki | F16D 65/18 188/72.1 |
| 2012/0103733 A1 | * | 5/2012 | Sekiguchi | F16D 65/18 188/72.1 |
| 2014/0166413 A1 | * | 6/2014 | Giering | B60T 13/741 188/156 |
| 2015/0233434 A1 | | 8/2015 | Hayashi et al. | |
| 2016/0091039 A1 | | 3/2016 | Masuda | |

FOREIGN PATENT DOCUMENTS

| | | |
|---|---|---|
| EP | 2431628 A1 | 3/2012 |
| JP | 2004308697 A | 11/2004 |
| JP | 2010038307 A | 2/2010 |
| JP | 2010-265971 A | 11/2010 |
| JP | 2011241851 A | 12/2011 |
| JP | 2014029193 A | 2/2014 |
| JP | 2014-062639 A | 4/2014 |
| JP | 2014-226007 A | 12/2014 |
| WO | 2010041588 A1 | 4/2010 |
| WO | 2011108450 A1 | 9/2011 |

OTHER PUBLICATIONS

Supplementary European Search Report for Serial No. EP 15 88 2734 dated Dec. 4, 2018.

* cited by examiner

BRAKE ACTUATOR AND BRAKE APPARATUS

CROSS-REFERENCE TO RELATED APPLICATIONS

This application is a National Stage application of International Patent Application No. PCT/JP2015/084668, filed on Dec. 10, 2015, which claims priority to Japanese Patent Application No. 2015-027091, filed on Feb. 16, 2015, each of which is hereby incorporated by reference in its entirety.

TECHNICAL FIELD

The present invention relates to a brake actuator provided in a brake apparatus to drive a piston which presses a pad.

BACKGROUND ART

As is known in the art, a vehicle such as automotive vehicle is provided with a brake apparatus corresponding to each wheel. A disc brake widely adapted as a brake apparatus has: a rotor (disc) which rotates with the wheel: paired pads (friction materials) arranged so as to oppose each other across the rotor; a claw portion which presses one pad toward the rotor; and a piston which presses the other pad toward the rotor. With brake pedal operation by a driver, a brake fluid is supplied to a caliper to cause the piston to move toward the rotor, and the paired pads are each pressed so as to sandwich the rotor to generate a braking force.

Meanwhile, with the advance of automobile technology, in place of development of mechanical brake apparatuses which is operated by a liquid pressure of the brake fluid as described above, development of electrically-operated brake apparatuses including an actuator controlled by an electrical signal has proceeded. Since this brake apparatus is designed without a master cylinder, liquid-pressure piping, booster, etc., the size and weight of the apparatus as a whole can be reduced. Also, a braking force can be controlled with high accuracy. Therefore, for example, this brake apparatus can be easily applied to, for example, a vehicle having an automatic tracking function of automatically controlling an acceleration or braking force in accordance with the behavior of another vehicle travelling forward. Furthermore, development of electrically-operated parking brake apparatuses has proceeded. This apparatus has also a function of a foot brake apparatus capable of obtaining a braking force by brake pedal operation by a driver as a brake apparatus.

This electrically-operated brake apparatus is described in, for example, Japanese Unexamined Patent Application Publication No. 2014-062639. The brake apparatus described in this Japanese Unexamined Patent Application Publication No. 2014-062639 is an electrically-operated parking brake apparatus having a mounting (mounting bracket) fixed to a vehicle body and a caliper body (caliper) movably provided to the mounting via paired slide pin bolts.

The caliper body has a U-shaped section extending across a disc rotor, and is movable to an axial direction of the disc rotor. The caliper body includes a claw portion which presses one pad, and has a piston which presses the other pad. The piston is driven by a driving apparatus (actuator) which is operated by, for example, operation of a parking brake switch provided inside the vehicle or the like.

The driving apparatus includes a gear body (case) attached to a bottom of a cylinder portion and formed into a substantially "L" shape, and the piston is movably accommodated in the gear body. An electric motor and a speed reduction apparatus for reducing the rotation of the electric motor to increase torque are accommodated in the gear body. With this, while a small-sized electric motor can be adopted and provided to the driving apparatus, the electric motor can be arranged in parallel with the cylinder portion, thereby improving mountability on the vehicle.

SUMMARY

However, in the technique described in Japanese Unexamined Patent Application Publication No. 2014-062639, the gear body has only two fixing portions which are fixed to the caliper body, and arranged so as to oppose each other with an output member (output shaft) taken as a center.

Therefore, when large torque from a speed reduction mechanism or a large counterforce or vibrations from a piston acts on the output member, the gear body may be swung with respect to the caliper body, with a straight line extending between two fixing locations taken as an axial center. Also, an electric-motor-side portion of the gear body may be twisted with respect to the output-member-side portion of the gear body.

In particular, in a large vehicle loaded with packages, such as a truck, since the weight of the vehicle is high, a large-sized brake apparatus is adopted. In this case, for example, since a speed reduction mechanism with a large speed reduction ratio is adopted, the required torque is increased, and the size of the speed reduction mechanism is also increased. For this reason, a large-sized gear body tends to be often adopted.

An object of the present invention is to provide a brake actuator and a brake apparatus which inhibit a sway of a case with respect to a caliper and a twist of the case itself, and can be sufficiently applied to a vehicle requiring large torque such as a truck.

According to one aspect of the present invention, there is provided a brake actuator which drives a piston movably held by a caliper, the brake actuator comprising: an electric motor having a rotation shaft; an output shaft which transmits motive power of the electric motor to the piston; a speed reduction mechanism provided between the rotation shaft and the output shaft; a case in which the electric motor and the speed reduction mechanism are accommodated; an accommodating portion provided to the case, the electric motor being accommodated in the accommodating portion, and a support portion provided to the case, and arranged in side by side relationship with the accommodating portion in a direction crossing an axial direction of the accommodating portion to support the output shaft, wherein the support portion has three or more caliper fixing portions fixed to the caliper, and arranged so as to surround the output shaft, one of the caliper fixing portions is defined as a first caliper fixing portion, the first caliper fixing portion is arranged on an extension line aligned with a straight line extending from the rotation shaft to the output shaft.

According to another aspect of the present invention, there is provided a brake apparatus having: a rotor; a pad pressed to the rotor; a piston which presses the pad; a caliper which movably holds the piston; and an actuator provided to the caliper to drive the piston, the actuator comprising: an electric motor having a rotation shaft; an output shaft which transmits motive power of the electric motor to the piston; a speed reduction mechanism provided between the rotation shaft and the output shaft; a case in which the electric motor and the speed reduction mechanism are accommodated; an accommodating portion provided to the case, the electric motor being accommodated in the accommodating portion, and a support portion provided to the case, and arranged in side by side relationship with the accommodating portion in a direction crossing an axial direction of the accommodating portion to support the output shaft, wherein the support portion has three or more caliper fixing portions fixed to the caliper, and arranged so as to surround the output shaft, one of the caliper fixing portions is defined as a first caliper fixing portion, the first caliper fixing portion is arranged on an extension line aligned with a straight line extending from the rotation shaft to the output shaft.

In another aspect of the present invention, the support portion further includes a first caliper fixing portion, a second caliper fixing portion, and a third caliper fixing portion.

In another aspect of the present invention, the second caliper fixing portion and the third caliper fixing portion are arranged on the same side as the accommodating portion in the support portion.

In another aspect of the present invention, the second caliper fixing portion and the third caliper fixing portion are arranged near an outer circumferential wall portion of the case coupling the accommodating portion and the support portion to each other.

In another aspect of the present invention, a length of a first straight line extending from the first caliper fixing portion to the output shaft, a length of a second straight line extending from the second caliper fixing portion to the output shaft, and a length of a third straight line extending from the third caliper fixing portion to the output shaft are equal to one another.

In another aspect of the present invention, the caliper fixing portions are equiangularly arranged and centered around the output shaft.

According to the present invention, the support portion has three or more caliper fixing portions fixed to the caliper, and these caliper fixing portions are arranged so as to surround the output shaft. Therefore, it is possible to firmly fix the case to the caliper at three or more fixing locations. When for example the case is fixed to the caliper at three fixing locations, if these positions of the fixing locations collectively define a "plane", it is possible to effectively inhibit a sway of the case with respect to the caliper. Also, a twist of the case itself can be inhibited, and it is possible to sufficiently support a vehicle requiring large torque such as a truck.

DETAILED DESCRIPTION

Hereinafter, the first embodiment of the present invention will be described in detail with reference to the drawings.

Figure 1:
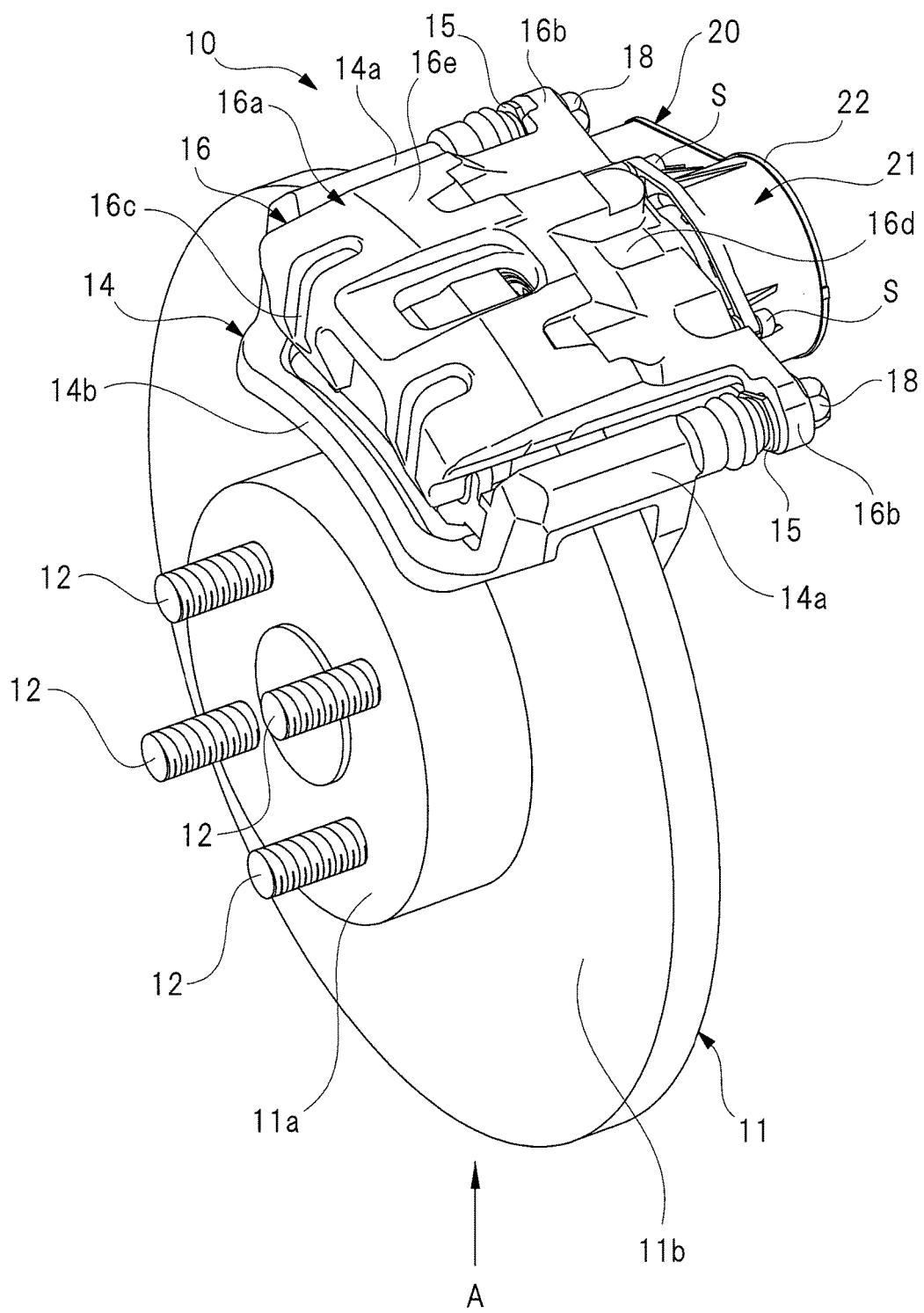
FIG. 1 is a perspective view showing a general outline of a brake apparatus according to the present invention.
Figure 2:
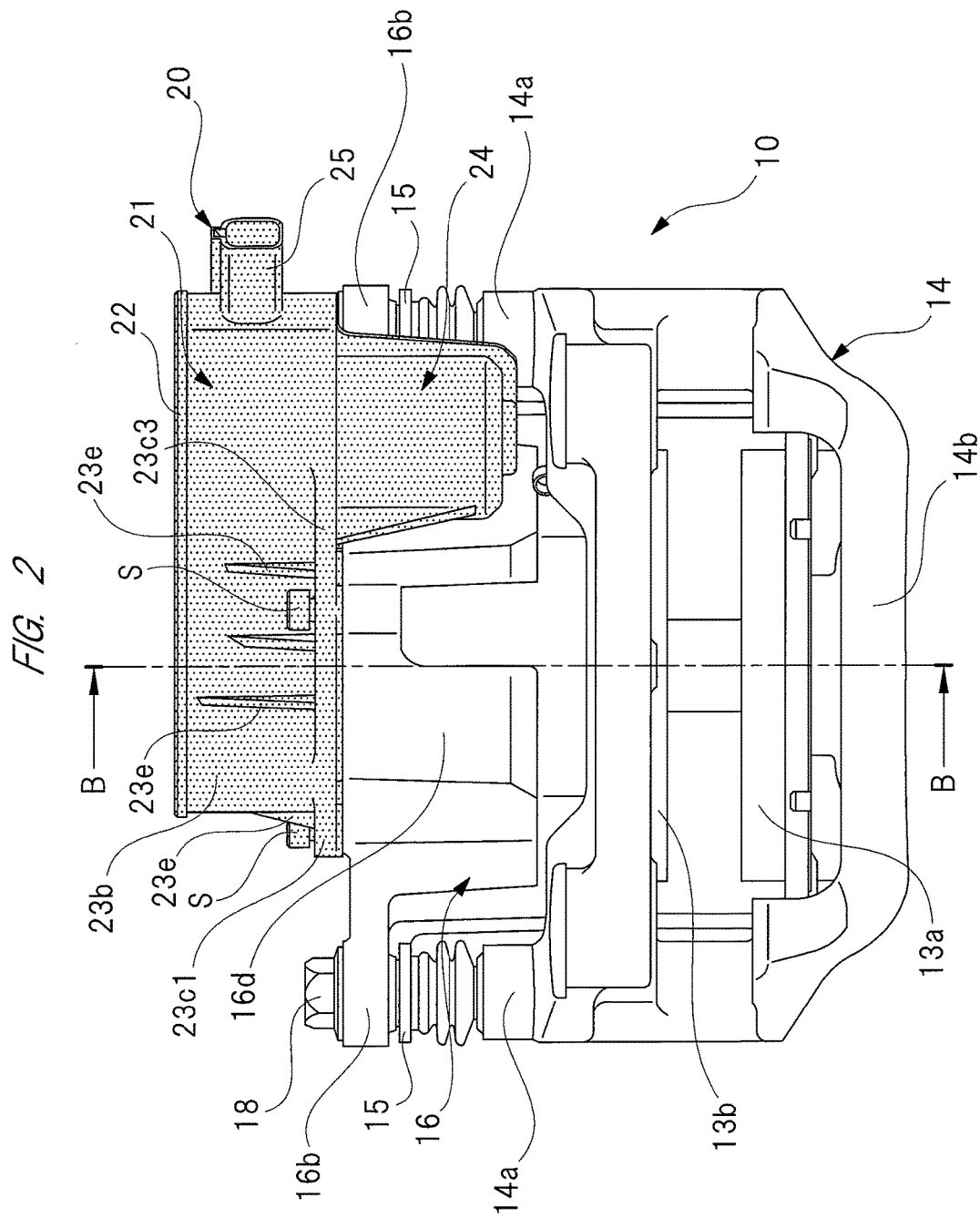
FIG. 2 is a plan view showing the brake apparatus (with a rotor omitted) of FIG. 1 in a direction of an arrow "A"
Figure 3:
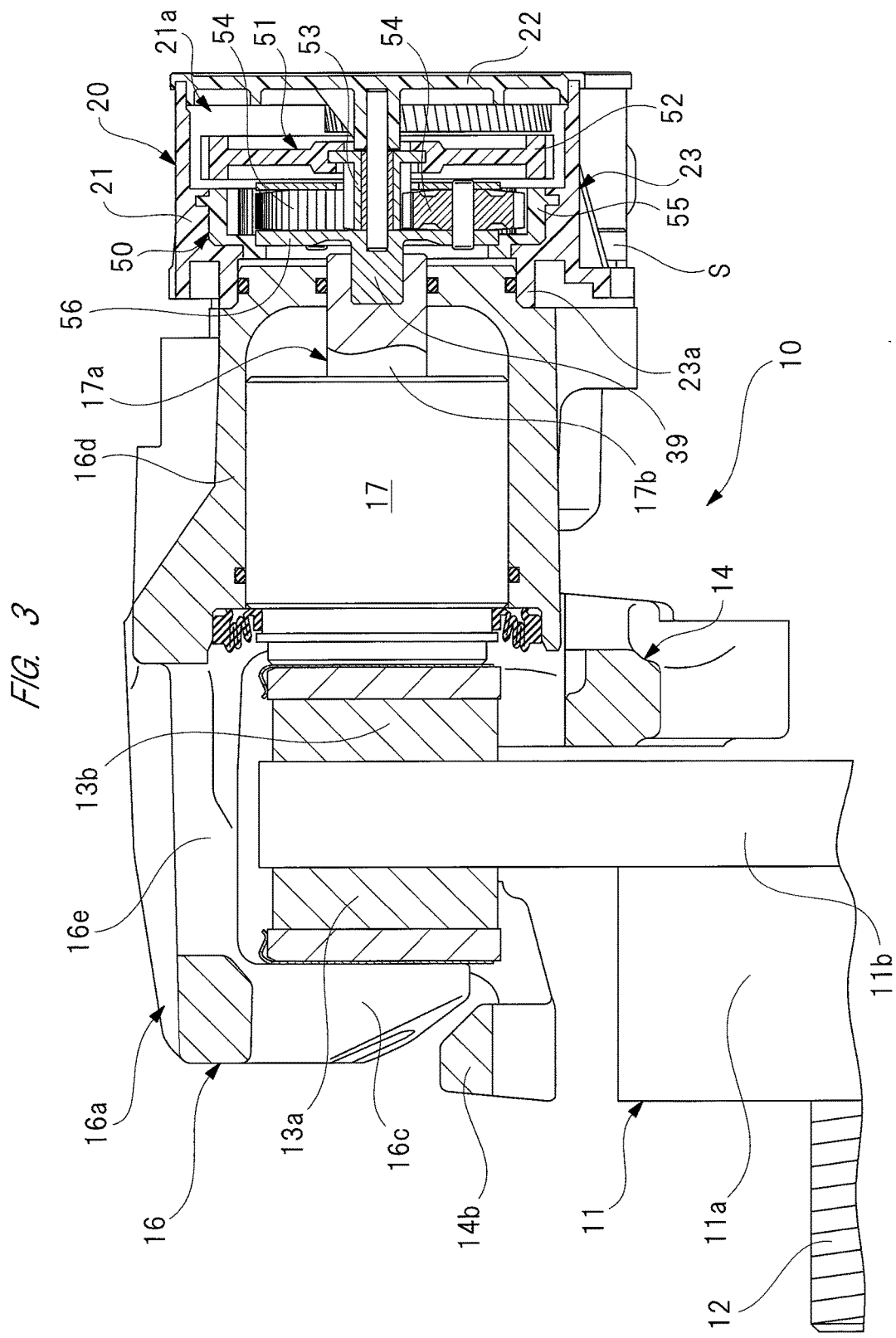
FIG. 3 is a partially enlarged sectional view taken along a line B-B of FIG. 2.
Figure 4:
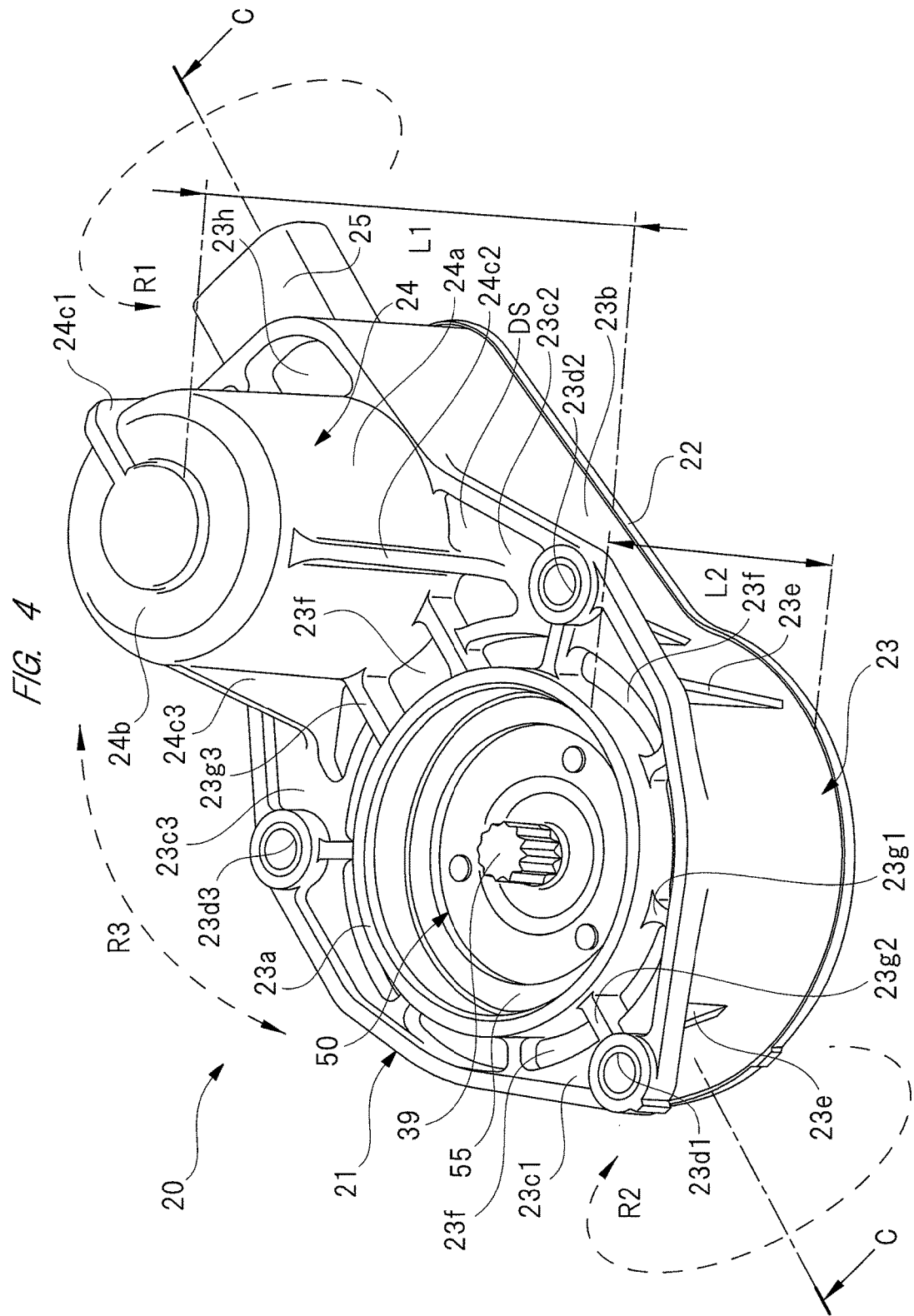
FIG. 4 is a perspective view showing a separated actuator.
Figure 5:
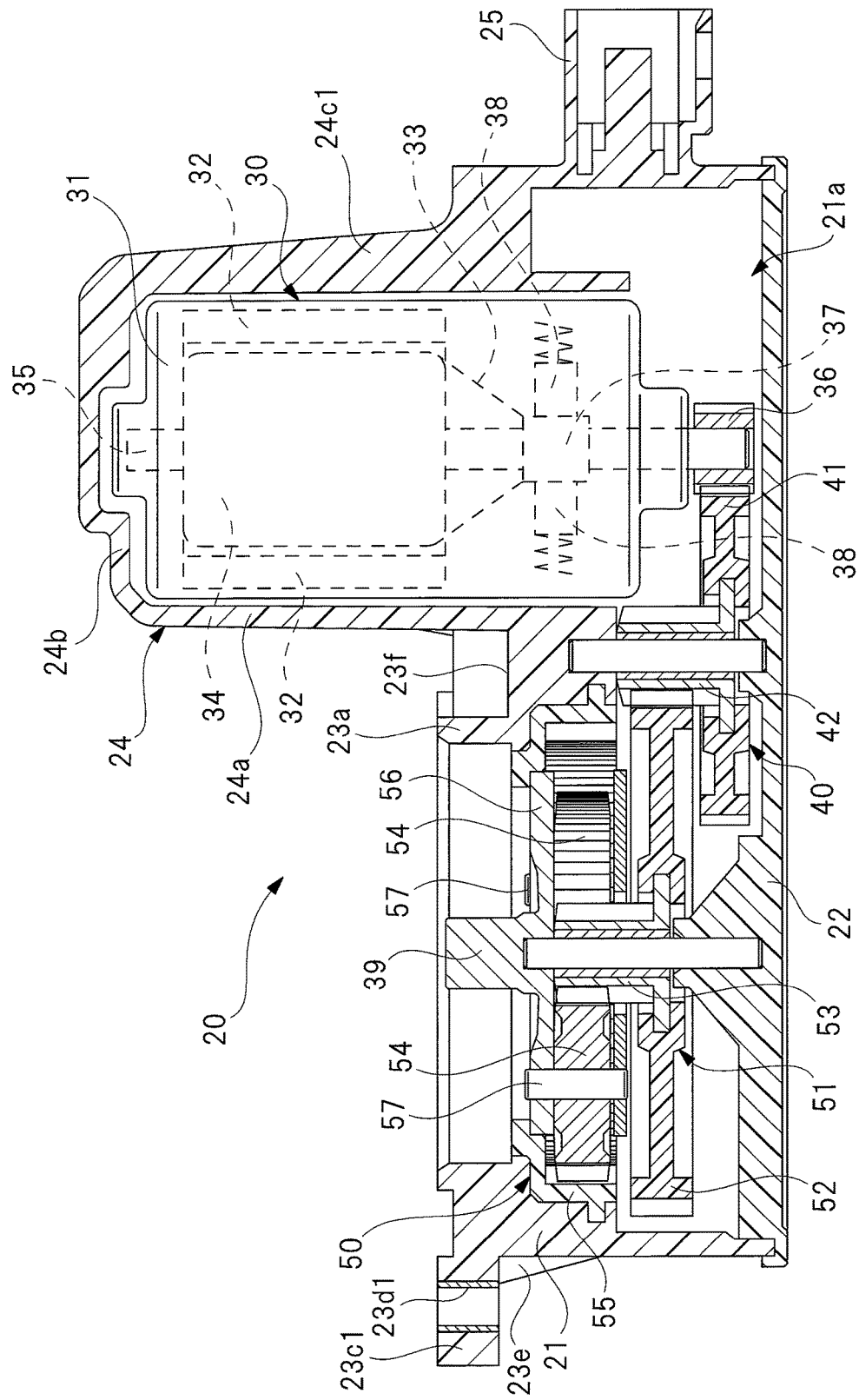
FIG. 5 is a sectional view taken along a line C-C of FIG. 4.
Figure 6:
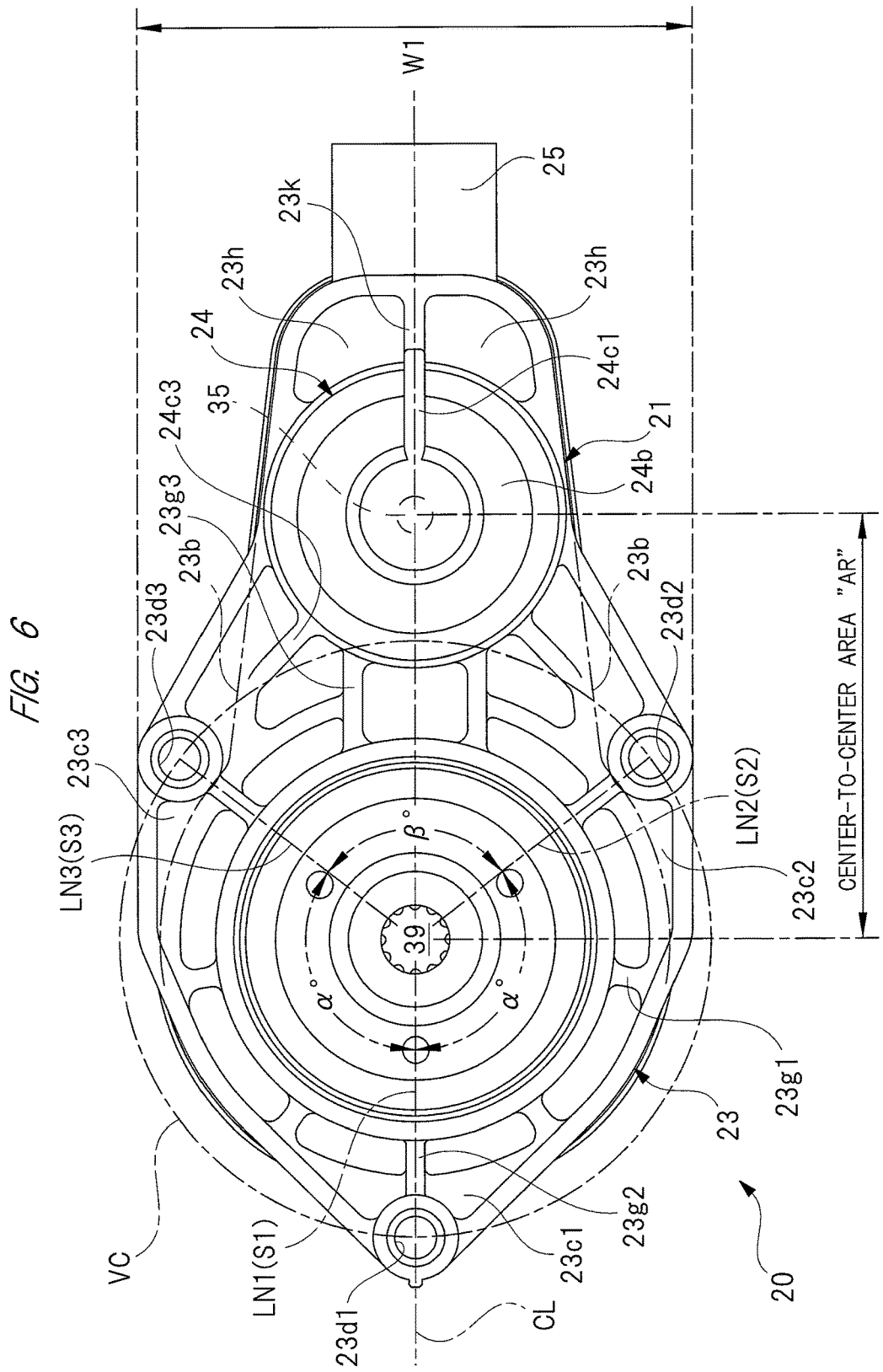
FIG. 6 is a plan view showing the separated actuator in an axial direction of an output shaft.

FIG. 1 is a perspective view showing a general outline of a brake apparatus according to the present invention; FIG. 2 is a plan view showing the brake apparatus (with a rotor omitted) of FIG. 1 in a direction of an arrow "A"; FIG. 3 is a partially enlarged sectional view taken along a line B-B of FIG. 2; FIG. 4 is a perspective view showing a separated actuator; FIG. 5 is a sectional view taken along a line C-C of FIG. 4; and FIG. 6 is a plan view showing the separated actuator in an axial direction of an output shaft.

In FIG. 2, an actuator 20 is hatched to clarify a state of the actuator 20 fixed to a caliper 16.

As shown in FIGS. 1 to 3, a brake apparatus 10 includes an electric parking brake apparatus, and includes a rotor 11 integrally and rotatably attached to an axel (not shown) of a vehicle. The rotor 11 includes: a rotor main body 11a having a plurality of (four in the drawing) hub bolts 12; and a disc portion 11b integrally provided outside the rotor main body 11a in a radial direction. The disc portion 11b forms a friction surface sandwiched by paired pads 13a and 13b. Also, a wheel (not shown) is attached to the rotor main body 11a, and a wheel nut (not shown) is screwed onto each of the hub bolts 12.

The brake apparatus 10 includes a mounting bracket 14 to be fixed to a non-rotating portion (not shown) such as a knuckle of the vehicle. This mounting bracket 14 is formed into a predetermined shape by casting, and paired pin attachment portions 14a to which paired slide pin bolts 15 are slidably attached are integrally provided. Each pin attachment portion 14a extends in an axial direction of the rotor 11, and each slide pin bolt 15 is movable in the axial direction of the rotor 11. Between the pin attachment portions 14a, a bridging portion 14b is integrally provided. The pin attachment portions 14a are arranged with a predetermined space in a circumferential direction of the rotor 11.

The brake apparatus 10 includes the caliper 16 movably attached to the mounting bracket 14. This caliper 16 is formed into a predetermined shape by casing, similarly to the mounting bracket 14, and includes a caliper main body 16a and paired pin fixing portions 16b. The caliper main body 16a has a substantially U-shaped section extending across the disc portion 11b of the rotor 11, and includes a claw portion 16c, a cylinder portion 16d, and a coupling portion 16e. The coupling portion 16e couples the claw portion 16c and the cylinder portion 16d with each other.

The claw portion 16c is arranged on the same side as the hub bolts 12 along the axial direction of the rotor 11. The cylinder portion 16d is arranged on the opposite side from the hub bolt 12 along the axial direction of the rotor 11. Here, on the opposite side from the hub bolt 12 along the axial direction of the rotor 11, a shock absorber (not shown) which attenuates vibrations of the vehicle is arranged. Thus, the brake apparatus 10 is fixed to the vehicle so as to avoid the shock absorber.

As shown in FIG. 3, the cylinder portion 16d is formed into a bottom-closed cylindrical shape. Inside the cylinder portion 16d, a piston 17 is slidably provided. That is, the piston 17 is movably held by the caliper 16, and slides in the axial direction of the rotor 11. Here, the inside of the cylinder portion 16d in the radial direction is cut so that the piston 17 can smoothly slide.

Furthermore, inside the cylinder portion 16d and on a back surface side (right side in the drawing) of the piston 17, brake fluid (not shown) is supplied by operation of a brake pedal (not shown). That is, at the time of normal braking by brake pedal operation of a driver, a braking force is generated by supply of the brake.

As shown in FIG. 1, the paired pin fixing portions 16b are provided so as to protrude in directions opposite to each other, and so as to oppose each other outside the cylinder portion 16d in the radial direction. Into a tip portion of each pin fixing portion 16b, a bolt 18 is inserted. The bolt 18 is fixed to the slide pin bolt 15. With this, the caliper 16 is movable in the axial direction of the rotor 11 with respect to the mounting bracket 14.

As shown in FIG. 3, the claw portion 16c presses one pad (outer pad) 13a disposed on the same side as the hub bolt 12 in the disc portion 11b toward the disc portion 11b. Also, the piston 17 presses the other pad (inner pad) 13b disposed on the opposite side from the hub bolts 12 in the disc portion 11b toward the disc portion 11b.

More specifically, at the time of service brake operation, when brake pedal operation by the driver supplies brake fluid to the back surface side of the piston 17, the piston 17 is pushed from inside the cylinder portion 16d to the outside to move to left in FIG. 3. Thus, the piston 17 presses the pad 13b toward the disc portion 11b. On the other hand, when the piston 17 presses the pad 13b, a counterforce causes the caliper 16 to move to right in FIG. 3 with respect to the mounting bracket 14. Thus, the claw portion 16c presses the pad 13a toward the disc portion 11b.

The piston 17 has a hollow structure, and a feed screw mechanism 17a (not shown in detail) is accommodated in this piston. The feed screw mechanism 17a includes a male screw member 17b to be forwardly and reversely rotated by the actuator 20. Also, the feed screw mechanism 17a includes a female screw member (not shown) where the male screw member 17b is screwed. Thus, at the time of parking brake operation with operation of a parking brake switch (not shown) inside the vehicle by the driver, the male screw member 17b is driven by the actuator 20 to rotate in a forward or reverse direction.

As shown in FIGS. 1 to 3, the brake apparatus 10 includes the actuator (brake actuator) 20 which drives the feed screw mechanism 17a. The actuator 20 is fixed to a bottom side opposite to a rotor 11 in the cylinder portion 16d. In the following, the structure of the actuator 20 which is operated at the time of operation of the parking brake switch will be described in detail by using the drawings.

As shown in FIGS. 4 and 5, the actuator 20 includes a case 21 formed in a substantially L-shape. This case 21 has an opening 21a (see FIGS. 3 and 5) hermetically sealed with a cover 22, thereby preventing rain water, dust, and so forth from entering the inside of the case 21. The case 21 and the cover 22 are each formed in a predetermined shape by injection molding of resin material.

Here, the case 21 occupies and forms most of an outer hull of the actuator 20, and it is exposed to adverse environments surrounding an undercarriage of the vehicle. Thus, the case 21 is formed of polybutylene terephthalate resin (PBT resin), which is excellent in weather resistance. As another characteristic, PBT resin further includes excellent thermostability, dimensional stability, chemical resistance, and so forth. "Thermostability" is a characteristic of a substance to resist thermal deformation even when exposed to a high-temperature environment for a long period of time. "Dimensional stability" is a characteristic of a substance to resist dimensional changes because the percentage of water absorption is low even when exposed to a humid environment. And "chemical resistance" is a characteristic of a substance to resist alteration with respect to organic solvents, gasoline, oil, and so forth.

Note that the material of the case 21 is not restricted to PBT resin and another material such as, for example, polyphenylene sulfide resin (PPS resin) may be used as long as the material has excellent weather resistance as described above. Furthermore, since the cover 22 is also exposed to the same adverse environments as those of the case 21, the cover 22 may be formed of the same PBT resin or another material with excellent weather resistance (such as PPS resin). Still further, as exposed to adverse environments as described above, the case 21 and the cover 22 are fixed together by appropriate welding means for mutually melting and fixing the resin materials together.

Here, an electric motor (motor) 30 and a speed reduction mechanism 50 are accommodated in the case 21. In the following, prior to detailed description of the structure of the case 21, the structures of the electric motor 30 and the speed reduction mechanism 50 will be described in detail.

As shown in FIG. 5, the electric motor 30 includes a motor case 31. The motor case 31 is formed into a bottomed shape, substantially cylindrical shape by, for example, pressing a steel plate (magnetic material). Inside the motor case 31, magnets 32 (only two are shown in the drawing) each having a substantially-arc-shaped section are fixed. Inside the magnets 32, an armature 34 having a coil 33 wound therearound is rotatably accommodated via a predetermined gap (air gap).

At the rotation center of the armature 34, a base end side of an armature shaft (rotation shaft) 35 is fixed to the armature 34. A tip end side of the armature shaft 35 extends to the outside of the motor case 31. At a tip portion of the armature shaft 35, a pinion gear 36 is fixed to the armature shaft 35. Between the armature 34 and the pinion gear 36 along the axial direction of the armature shaft 35, a commutator 37 electrically connected to an end of the coil 33 is fixed. On an outer peripheral portion of the commutator 37, paired brushes 38 slidably make contact. Note that the commutator 37 and each brush 38 are also accommodated inside the motor case 31.

With the parking brake switch operated at the time of stop of the vehicle, a driving current is supplied to each brush 38. Then, the driving current is supplied to the coil 33 via each brush 38 and the commutator 37, thereby generating an electromagnetic force in the armature 34. Thus, the armature shaft 35 (pinion gear 36) is driven to rotate to a predetermined direction with a predetermined number of revolutions. Here, the driving current to be supplied to each brush 38 is supplied from a vehicle-side connector (not shown) connected to a connector connecting portion 25 provided to the case 21.

As shown in FIG. 5, an output shaft 39 coupled to the male screw member 17b (see FIG. 3) so as to be integrally rotatable to transmit motive power of the electric motor 30 to the piston 17 is rotatably provided to the case 21. This output shaft 39 is integrally provided to a planetary carrier 56 forming the speed reduction mechanism 50, and transmits a rotary force with increased torque to the male screw member 17b. The armature shaft 35 and the output shaft 39 are provided to the case 21 so as to be aligned in parallel, and the speed reduction mechanism 50 is provided between the armature shaft 35 and the output shaft 39.

Also, between the speed reduction mechanism 50 and the pinion gear 36, an input-side two-stage gear 40 for transmitting motive power to the output shaft 39 arranged in parallel with the armature shaft 35 is provided. This input-side two-stage gear 40 includes: a large-diameter gear 41 to be engaged with the pinion gear 36; and a small-diameter gear 42 to be engaged with a large-diameter gear 52 of an output-side two-stage gear 51 forming the speed reduction mechanism 50.

The speed reduction mechanism 50 is composed of a planetary gear speed reduction mechanism, and has the output-side two-stage gear 51. This output-side two-stage gear 51 includes: the large-diameter gear 52 to be engaged with the small-diameter gear 42 of the input-side two-stage gear 40; and a small-diameter gear 53 functioning as a sun gear. Also, the speed reduction mechanism 50 includes three (only two are shown in the drawing) planetary gears 54. These planetary gears 54 are each engaged with both of the small-diameter gear 53 and an internal gear 55.

Each planetary gear 54 is rotatably supported by the planetary carrier 56 via a support pin 57. The internal gear 55 is fixed to the case 21 by insert molding, and the planetary carrier 56 is relatively rotatable with respect to the internal gear 55. With this, the rotation of the armature shaft 35 is transmitted via the input-side two-stage gear 40 and the output-side two-stage gear 51 to the speed reduction mechanism 50, and is decelerated by the speed reduction mechanism 50. Then, the rotary force decelerated by the speed reduction mechanism 50 so as to have increased torque is transmitted to the male screw member 17b (see FIG. 3) from the output shaft 39, thereby moving the piston 17 with a large force. Thus, by using the small-sized electric motor 30, an electrically-operated parking brake apparatus can be constructed.

Here, since the internal gear 55 is provided in a space formed and hermetically sealed with the case 21 and the cover 22, weather resistance is not required, unlike the case 21 and the cover 22. On the other hand, since the internal gear 55 is used as a motive power transmitting element forming the speed reduction mechanism 50, mechanical strength and durability are required. Thus, in the present embodiment, the internal gear 55 is formed of PA66 resin (polyamide 66) which is polyamide-based resin, thereby obtaining sufficient strength while achieving light weight of the internal gear 55. Here, polyamide-based resin has an excellent characteristic in mechanical strength, and it has an excellent characteristic also in chemical resistance as described above.

However, the material of the internal gear 55 is not restricted to PA66 resin, and metal material with higher strength such as aluminum may be used as long as strength suitable for the motive power transmitting element can be obtained. In this manner, in the present embodiment, the case 21 and the internal gear 55 are different in material from each other, and the case 21 and the internal gear 55 are formed of optimum material, thereby achieving the failure-resistant and highly-reliable actuator 20.

As shown in FIGS. 4 to 6, the case 21 includes: a fixing portion 23 to be fixed to the cylinder portion 16d (see FIG. 3) of the caliper 16; and an accommodating portion 24 in the electric motor 30 is accommodated (see FIG. 5). The fixing portion 23 is arranged in a direction crossing the axial direction of the accommodating portion 24. The fixing portion 23 is provided to a portion where the output shaft 39 of the case 21 is arranged, and is arranged coaxially with the output shaft 39 and the speed reduction mechanism 50. The fixing portion 23 rotatably supports the output shaft 39 via the internal gear 55. That is, the fixing portion 23 constitutes a "support portion" in the present invention.

Inside the fixing portion 23 in a radial direction thereof, a cylindrical fixing portion 23a is provided. To a tip side of the cylindrical fixing portion 23a in the axial direction, a bottom side of the cylinder portion 16d is fitted and fixed. Also, outside the fixing portion 23 in the radial direction, an outer circumferential wall portion 23b forming part of the outer hull of the case 21 is provided.

On the other hand, the accommodating portion 24 is provided to a portion of the case 21 where the electric motor 30 is arranged, and is arranged coaxially with the armature shaft 35 (see FIG. 5). The accommodating portion 24 includes: a cylindrical main body portion 24a extending in the axial direction of the armature shaft 35; and a step-shaped bottom wall portion 24b opposite to a cover 22 along an axial direction of this cylindrical main body portion 24a. The electric motor 30 is firmly fixed by fastening means (not shown) so as to be inserted into the accommodating portion 24, and not relatively rotatable with respect to the accommodating portion 24.

As shown in FIG. 4, a length L1 of the accommodating portion 24 in the axial direction is longer in dimension than a length L2 of the fixing portion 23 in the axial direction (L1>L2). Here, the length L1 of the accommodating portion 24 in the axial direction is a length dimension from an opening 21a (see FIG. 5) of the case 21 to the bottom wall portion 24b of the accommodating portion 24, and the length L2 of the fixing portion 23 in the axial direction is a length dimension from the opening 21a of the case 21 to a tip portion of the cylindrical fixing portion 23a of the fixing portion 23. Also, the length L1 in the axial direction is substantially double the length L2 in the axial direction.

With this, the electric motor 30 can be arranged just beside the cylinder portion 16d so that the armature shaft 35 and the output shaft 39 become parallel to each other with the actuator 20 fixed to the caliper 16, as shown in FIG. 2. Thus, it is possible to inhibit an increase of the dimension of the cylinder portion 16d in the axial direction to avoid a contact of the brake apparatus 10 with a shock absorber or the like.

Here, as shown in FIG. 5, the case 21 is integrally provided with the connector connecting portion 25 on the opposite side of the accommodating portion 24 from the fixing portion 23 in a longitudinal direction (lateral direction in the drawing) of the case 21, and the connector connecting portion 25 is electrically connected to the vehicle-side connector. Inside this connector connecting portion 25, a feeding terminal (not shown) for supplying the driving current from the vehicle-side connector to each brush 38 is provided.

Also as shown in FIG. 2, the connector connecting portion 25 is oriented in a direction opposite to the cylinder portion 16d, with the actuator 20 fixed to the caliper 16. With this, the vehicle-side connector can be easily and reliably connected to the connector connecting portion 25, with the brake apparatus 10 attached to the vehicle.

As shown in FIGS. 4 to 6, the fixing portion 23 includes the cylindrical fixing portion 23a and the outer circumferential wall portion 23b. The outer circumferential wall portion 23b is provided over the entire periphery of the case 21. To the outer circumferential wall portion 23b, three protruding portions in total, that is, a first protruding portion 23c1, a second protruding portion 23c2, and a third protruding portion 23c3 are integrally provided so as to partially protrude outside in a radial direction. The protruding portions 23c1, 23c2, and 23c3 are respectively provided with three screw insertion portions in total, that is, a first screw insertion portion 23d1, a second screw insertion portion 23d2, and a third screw insertion portion 23d3.

Here, each of the screw insertion portions 23d1, 23d2, and 23d3 constitutes a "caliper fixing portion" in the present invention, and these screw insertion portions 23d1, 23d2, and 23d3 are arranged outside the fixing portion 23 in the radial direction. Note that the first screw insertion portion 23d1 constitutes a first caliper fixing portion in the present invention, the second screw insertion portion 23*d*2 constitutes a second caliper fixing portion in the present invention, and the third screw insertion portion 23*d*3 constitutes a third caliper fixing portion.

Into the screw insertion portions 23*d*1, 23*d*2, and 23*d*3, fixing screws "s" (see FIGS. 1 and 2) for fixing the actuator 20 to the caliper 16 are respectively inserted. With this, each of the protruding portions 23*c*1, 23*c*2, and 23*c*3 (each of the screw insertion portions 23*d*1, 23*d*2, and 23*d*3) of the case 21 is firmly fixed to the caliper 16.

The screw insertion portions 23*d*1, 23*d*2, and 23*d*3 are arranged so as to surround the periphery of the output shaft 39 outside the output shaft 39 in the radial direction. More specifically, as shown in FIG. 6, the screw insertion portions 23*d*1, 23*d*2, and 23*d*3 are all arranged on a virtual circle VC centering at the output shaft 39. That is, a length S1 of a first straight line LN1 connecting the center of the first screw insertion portion 23*d*1 and the center of the output shaft 39, a length S2 of a second straight line LN2 connecting the center of the second screw insertion portion 23*d*2 and the center of the output shaft 39, and a length S3 of a third straight line LN3 connecting the center of the third screw insertion portion 23*d*3 and the center of the output shaft 39 are equal to one another (S1=S2=S3).

Among the screw insertion portions 23*d*1, 23*d*2, and 23*d*3, the first screw insertion portion 23*d*1 is arranged on an extension line aligned with a center straight line CL connecting the axial center of the armature shaft 35 and the axial center of the output shaft 39. The case 21 is symmetrical in a mirror image about the center straight line CL taken as a boundary. Therefore, the first screw insertion portion 23*d*1 arranged on the extension line aligned with the center straight line CL and the second and third screw insertion portions 23*d*2 and 23*d*3 arranged symmetrically in a mirror image effectively inhibit a twist of the case 21 with respect to the caliper 16 (see FIG. 3) with the center straight line CL taken as an axial center. More specifically, as shown in FIG. 4, a twist of the case 21 along directions indicated by broken-line arrows R1 and R2 is effectively inhibited.

Furthermore, among the screw insertion portions 23*d*1, 23*d*2, and 23*d*3, the second screw insertion portion 23*d*2 and the third screw insertion portion 23*d*3 are arranged between the armature shaft 35 and the output shaft 39 and on the same side as an accommodating portion 24 of the fixing portion 23, that is, as shown in FIG. 6, within a range of an inter-axis region AR. With this, as shown in FIG. 4, distortion (tilt and falling) of the case 21 along a direction indicated by a broken-line arrow R3 is effectively inhibited.

Also, the second screw insertion portion 23*d*2 and the third screw insertion portion 23*d*3 are arranged in a portion of the case 21 near the outer circumferential wall portion 23*b* connecting the accommodating portion 24 and the fixing portion 23. This allows the second screw insertion portion 23*d*2 and the third screw insertion portion 23*d*3 to be each arranged near the outer circumferential wall portion 23*b* of the case 21, and an increase of a width dimension W1 of the actuator 20 along a short direction is inhibited.

Here, an angle α° formed by the first straight line LN1 and the second straight line LN2 is slightly larger than 120°. Also, since the case 21 is symmetrical in a mirror image about the center straight line CL taken as a boundary, an angle formed by the first straight line LN1 and the third straight line LN3 is α° slightly larger than 120°. By contrast, an angle β° formed by the second straight line LN2 and the third straight line LN3 is slightly smaller than) 120° (α°>β°.

In this manner, with the three screw insertion portions 23*d*1, 23*d*2, and 23*d*3 provided on the periphery of the output shaft 39 at a substantially equal angle, the actuator 20 can be fixed to the caliper 16 with a uniform fixing force so that the axial center of the output shaft 39 is not shifted from the center axis of the piston 17.

As shown in FIGS. 2 and 4, between each of the screw insertion portions 23*d*1, 23*d*2, and 23*d*3 and the outer circumferential wall portion 23*b*, a fixing-portion reinforcing rib 23*e* for enhancing a fixing strength of each of the screw insertion portions 23*d*1, 23*d*2, and 23*d*3 to the outer circumferential wall portion 23*b* is integrally formed. With this, the case 21 is inhibited from rattling with respect to the caliper 16 at the time of operation of the actuator 20.

Also, outside the accommodating portion 24 in the radial direction, three reinforcing ribs 24*c*1, 24*c*2, and 24*c*3 are integrally provided. These reinforcing ribs 24*c*1, 24*c*2, and 24*c*3 are provided so as to inhibit the accommodating portion 24 with the length L1 in the axial direction from being tilted (falling) or twisted with respect to the fixing portion 23 with the length L2 in the axial direction, as shown in FIG. 4.

Furthermore, since the case 21 is formed by injection molding of resin material (PBT resin), the resin is shrunk to cause shrink marks at the time of curing. Each of the reinforcing ribs 24*c*1, 24*c*2, and 24*c*3 inhibits a tilt and distortion of the accommodating portion 24 with respect to the fixing portion 23 due to the occurrence of shrink marks at the time of curing of the case 21.

Among the three reinforcing ribs 24*c*1, 24*c*2, and 24*c*3, two reinforcing ribs 24*c*2 and 24*c*3 on the same side as a fixing portion 23 protrude toward the outer circumferential wall portion 23*b* of the fixing portion 23 with the accommodating portion 24 viewed from its axial direction. With this, the reinforcing ribs 24*c*2 and 24*c*3 are each arranged in a dead space DS of the case 21. Thus, each of the reinforcing ribs 24*c*2 and 24*c*3 can be formed so as to be relatively large, and so as to enhance its stiffness.

Also, with the reinforcing ribs 24*c*2 and 24*c*3 each arranged in the dead space DS of the case 21, while a tilt of the accommodating portion 24 toward a fixing portion 23 is inhibited, the reinforcing ribs 24*c*2 and 24*c*3 can be arranged so as to be close to each other within a range where the cylinder portion 16*d* and the accommodating portion 24 do not interfere with each other, that is, at a position evading the cylinder portion 16*d*. That is, the arrangement locations of the reinforcing ribs 24*c*2 and 24*c*3 are advantageous for reducing the size and weight of the brake apparatus 10.

Furthermore, a stress loaded to each of the reinforcing ribs 24*c*2 and 24*c*3 is escaped to the outer circumferential wall portion 23*b*. Thus, a tilt and twist of the accommodating portion 24 with respect to the fixing portion 23 are more reliably inhibited. Here, the material thickness of the outer circumferential wall portion 23*b* along the axial direction of the output shaft 39 is thick, and stiffness of the outer circumferential wall portion 23*b* along the axial direction of the output shaft 39 is high. Also, the outer circumferential wall portion 23*b* is coupled to the second protruding portion 23*c*2 and the third protruding portion 23*c*3 via the fixing-portion reinforcing rib 23*e*. Therefore, the stress loaded from each of the reinforcing rib 24*c*2 and the reinforcing rib 24*c*3 inhibits the outer circumferential wall portion 23*b* from being deformed.

As shown in FIG. 4, a plurality of thinned portions 23*f* are provided to the fixing portion 23. These thinned portions 23*f* are provided on the same side as a cylinder portion 16*d* (upper side in the drawing) of the fixing portion 23 and on the periphery of the cylindrical fixing portion 23*a*. The thinned portions 23*f* are each disposed between the cylindrical fixing portion 23a and the outer circumferential wall portion 23b, and are arranged so as to be aligned in a circumferential direction of the cylindrical fixing portion 23a. The thinned portions 23f are each provided to prevent deformation due to shrink marks of the fixing portion 23 and to reduce the weight of the case 21, and are provided so as to be recessed in the axial direction of the output shaft 39.

The thinned portions 23f are sectioned from one another by a plurality of radial ribs 23g1, 23g2, and 23g3 radially provided, with the output shaft 39 taken as a center. Among the radial ribs 23g1, 23g2, and 23g3, the radial ribs 23g1 are provided between the cylindrical fixing portion 23a and the outer circumferential wall portion 23b, the radial ribs 23g2 are provided between the cylindrical fixing portion 23a and each of the screw insertion portions 23d1, 23d2, and 23d3, and the radial ribs 23g3 are provided between the cylindrical fixing portion 23a and the accommodating portion 24.

The radial ribs 23g2 between the cylindrical fixing portion 23a and each of the screw insertion portions 23d1, 23d2, and 23d3 enhance stiffness between them and also inhibit a twist and rattling of the case 21 with respect to the caliper 16. Also, the radial ribs 23g3 between the cylindrical fixing portion 23a and the accommodating portion 24 also inhibit a tilt and distortion of the accommodating portion 24 with respect to the fixing portion 23.

Here, the reinforcing ribs 24c2 and 24c3 are coupled to the outer circumferential wall portion 23b at positions which do not overlap each thinned portion 23f with the accommodating portion 24 viewed from the axial direction. With this, the shape of each mold (not shown) for use in injection molding of the case 21 can be simplified. Also, the stress loaded from each of the reinforcing ribs 24c2 and 24c3 is prevented from being loaded onto the thinned portions 23f as thinned portions of the case 21.

Also, as shown in FIGS. 4 and 6, paired thinned portions 23h are also provided on the opposite side of the case 21 from the opening 21a, and between the accommodating portion 24 and the connector connecting portion 25. Furthermore, between the thinned portions 23h, a reinforcing rib 23k coupled to the reinforcing rib 24c1 is provided. The thinned portions 23h are each provided to prevent deformation of the accommodating portion 24 due to shrink marks and to reduce the weight of the case 21. The reinforcing rib 23k inhibits a tilt (falling) and twist of the accommodating portion 24 with respect to the fixing portion 23, in cooperation with the reinforcing rib 24c1.

As has been described in detail above, according to the present embodiment, the fixing portion 23 has three screw insertion portions 23d1, 23d2, and 23d3 which are fixed to the caliper 16, and these screw insertion portions 23d1, 23d2, and 23d3 are arranged so as to surround the output shaft 39. With this, the case 21 can be firmly fixed at three fixing locations with respect to the caliper 16. Also, these three fixing locations define a "plane". Thus, it is possible to effectively inhibit a sway of the case 21 with respect to the caliper 16. Furthermore, a twist of the case 21 can be inhibited, and it is possible to sufficiently support a vehicle requiring large torque such as a truck.

Also, according to the present embodiment, the first screw insertion portion 23d1 is arranged the extension line aligned with on the center straight line CL connecting the armature shaft 35 and the output shaft 39. With this, a twist of the case 21 with the center straight line CL taken as an axial center can be effectively inhibited.

Furthermore, according to the present embodiment, the second screw insertion portion 23d2 and the third screw insertion portion 23d3 are arranged on the same side as the accommodating portion 24 of the fixing portion 23. With this, a twist and warp of the case 21 between the accommodating portion 24 and the fixing portion 23 can be effectively inhibited.

Here, in the case 21, a portion between the accommodating portion 24 in which the heavy-weight electric motor 30 is accommodated and the fixing portion 23 supporting the output shaft 39 for outputting a rotary force with increased torque has to be the most firmly fixed to the caliper 16. Therefore, arranging the second screw insertion portion 23d2 and the third screw insertion portion 23d3 (two points) on the same side as the accommodating portion 24 of the fixing portion 23 is effective in structure for addressing an increase of the size of the brake apparatus 10, improving stiffness of the brake apparatus, and so forth.

Also, according to the present embodiment, the second screw insertion portion 23d2 and the third screw insertion portion 23d3 are arranged near the outer circumferential wall portion 23b of the case 21 connecting the accommodating portion 24 and the fixing portion 23. With this, the second screw insertion portion 23d2 and the third screw insertion portion 23d3 can be each brought close to the outer circumferential wall portion 23b of the case 21 to inhibit an increase of the width dimension W1 of the actuator 20 along the short direction, as shown in FIG. 6.

Furthermore, according to the present embodiment, the length S1 of the first straight line LN1 connecting the first screw insertion portion 23d1 and the output shaft 39, the length S2 of the second straight line LN2 connecting the second screw insertion portion 23d2 and the output shaft 39, and the length S3 of the third straight line LN3 connecting the third screw insertion portion 23d3 and the output shaft 39 are equal to one another. With this, a favorable fixing balance of the case 21 with respect to the caliper 16 can be achieved with the output shaft 39 taken as a center, and a twist force (stress) of the case 21 can be escaped substantially equally to each of the screw insertion portions 23d1, 23d2, and 23d3. Therefore, it is possible to inhibit rattling of the actuator 20 with respect to the caliper 16 at the time of operation and to effectively suppress unusual noise from the actuator 20.

Next, the second embodiment of the present invention will be described in detail with reference to the drawings. Note that portions the same in function as those of the first embodiment are respectively denoted by the same reference numbers as those of the first embodiment, and detail description thereof is omitted in this embodiment.

Figure 7:
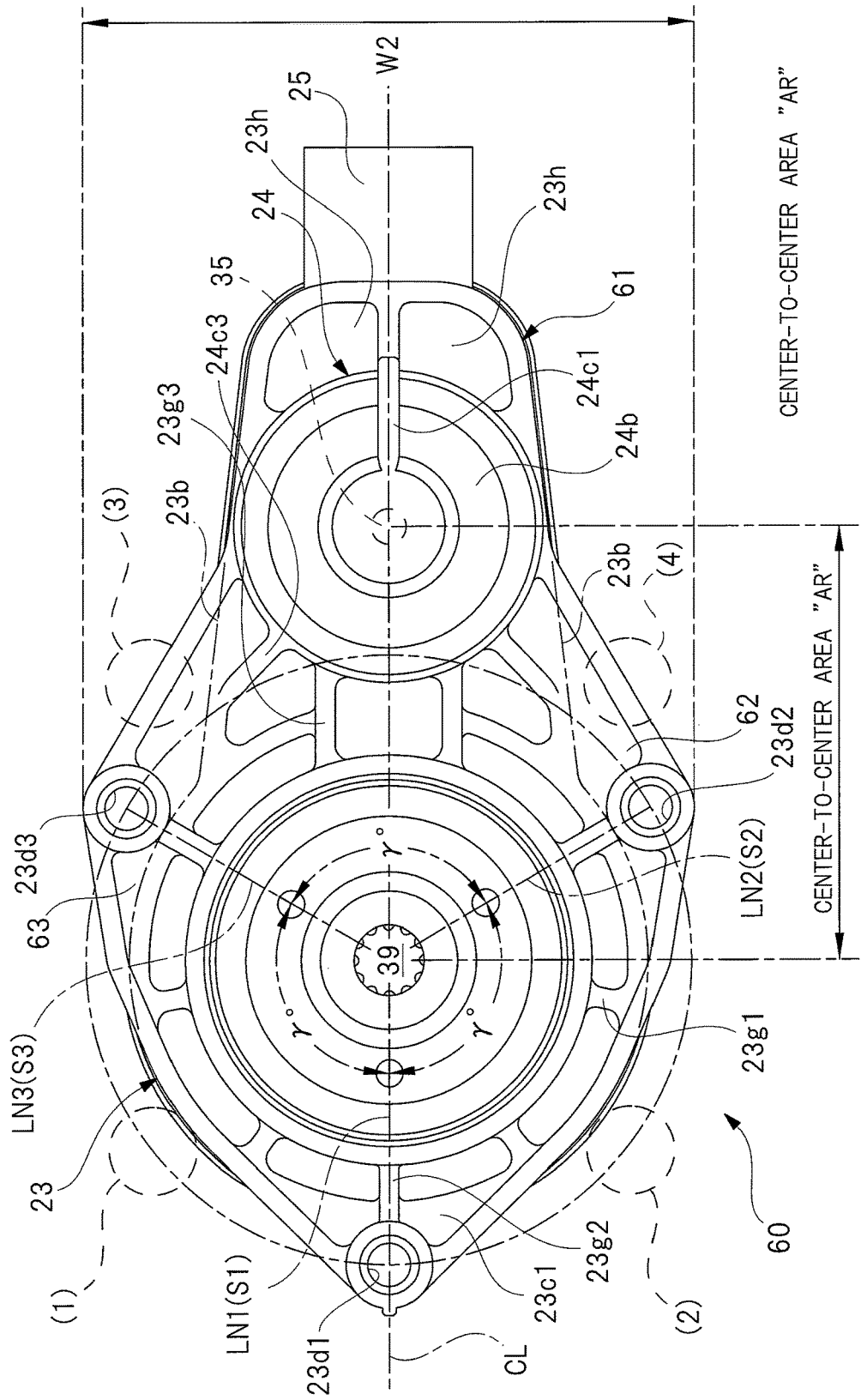
FIG. 7 is a diagram showing a separated actuator of a second embodiment corresponding to that of FIG. 6.

FIG. 7 is a diagram showing a separated actuator of a second embodiment corresponding to that of FIG. 6.

An actuator (brake actuator) 60 according to a second embodiment is different from that of the first embodiment only in the structure of a case 61. More specifically, the amount of protrusion of each of a second protruding portion 62 and a third protruding portion 63 provided to the case 61 from the outer circumferential wall portion 23b is larger, compared with the first embodiment (see FIG. 6). Also, accordingly, the positions of the second screw insertion portion 23d2 and the third screw insertion portion 23d3 are different, compared with the first embodiment.

In the second embodiment, as shown in FIG. 7, the screw insertion portions 23d1, 23d2, and 23d3 are equiangularly arranged at $\gamma°$ ($=120°$) intervals, with the output shaft 39 taken as a center. That is, the angle formed by the first straight line LN1 and the second straight line LN2, the angle formed by the first straight line LN1 and the third straight line LN3, and the angle formed by the second straight line LN2 and the third straight line LN3 are completely equal to one another, that is, γ°. With this, a width dimension W2 of the actuator 60 along a short direction is slightly larger, compared with the first embodiment (W2>W1). However, as will be described further below, an effect of achieving an excellent fixing balance can be provided.

Also in the second embodiment formed as described above, operations and effects similar to those of the above-described first embodiment can be achieved. In addition, in the second embodiment, the screw insertion portions 23*d*1, 23*d*2, and 23*d*3 are equiangularly arranged at γ° (=120°) intervals, with the output shaft 39 taken as a center. Thus, a fixing balance of the case 61 with respect to the caliper 16 with the output shaft 39 taken as a center can be made more favorable.

The present invention is not to be limited to the described embodiment. Alternations and/or modifications of the illustrated and/or described embodiments are contemplated as being alternative forms of the invention as far as they do not depart from the scope of the present invention, which is defined by the appended claims. For example, while three screw insertion portions, that is, the first screw insertion portion 23*d*1, the second screw insertion portion 23*d*2, and the third screw insertion portion 23*d*3, are all arranged on the virtual circle VC in each of the above-described embodiments as shown in FIGS. 6 and 7, the present invention is not restricted to this.

For example, in FIG. 7, in place of the first screw insertion portion 23*d*1, a screw insertion portion may be provided to each of a portion indicated by a broken circle (1) and a portion indicated by a broken circle (2) (i.e., portions symmetrical in a mirror image about the center straight line CL taken as a boundary). Also, in FIG. 7, in place of the second screw insertion portion 23*d*2 and the third screw insertion portion 23*d*3, a screw insertion portion may be provided to each of a portion indicated by a broken circle (3) and a portion indicated by a broken circle (4) (portions symmetrical in a mirror image about the center straight line CL taken as a boundary). In short, in accordance with a required fixing balance and so forth, screw insertion portions (caliper fixing portions) may be provided at positions deviated from the virtual circle VC as long as the positions are symmetrical in a mirror image about the center straight line CL of the case 21 or 61 taken as a boundary. Also, the number of screw insertion portions may be any as long as the number is three or more, such as four or five.

Also, while the brake apparatus 10 is an electrically-operated parking brake apparatus in each of the above-described embodiments, the present invention is not restricted to this, and can be applied also to a by-wire-type brake apparatus (brake by wire) including an actuator operating with brake pedal operation by a driver and connected only via electric wiring.

Furthermore, while the electric motor 30 is a brush-equipped motor in each of the above-described embodiments as shown in FIG. 5, the present invention is not restricted to this, and a brushless motor can be adopted. In this case, it is possible to suppress noises from the electric motor and more effectively reduce adverse effects on another vehicle-mounted device.

Also, the present invention is not restricted to the various embodiments described above, and can be modified, improved, and so forth as appropriate. In addition, the material, shape, dimensions, number, arrangement location, and so forth of each component in each of the above-described embodiments can be any as long as they can achieve the present invention, and are not restricted to those described above.

The brake actuator is used as a driving source of a brake apparatus provided so as to correspond to a wheel of a vehicle such as automotive vehicle to drive a piston which presses a pad.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A brake actuator configured to drive a piston movably held by a caliper, formed as an element separated from the caliper, and attached to the caliper, the brake actuator comprising:
   an electric motor having a rotation shaft;
   an output shaft which transmits motive power of the electric motor to the piston;
   a speed reduction mechanism provided between the rotation shaft and the output shaft;
   a case in which the electric motor and the speed reduction mechanism are accommodated, the case being formed of resin material;
   an accommodating portion provided to the case, the electric motor being accommodated in the accommodating portion, and
   a support portion provided to the case, and arranged in side by side relationship with the accommodating portion in a direction crossing an axial direction of the accommodating portion to support the output shaft,
   wherein the support portion has three or more caliper fixing portions fixed to the caliper, and arranged so as to surround the output shaft,
   one of the caliper fixing portions is defined as a first caliper fixing portion,
   the first caliper fixing portion is arranged on an extension line aligned with a straight line extending from the rotation shaft to the output shaft,
   a first straight line extending from the first caliper fixing portion to the output shaft, a second straight line extending from a second caliper fixing portion to the output shaft, and a third straight line extending from a third caliper fixing portion to the output shaft are the same in length as each other.

2. The brake actuator according to claim 1, wherein the support portion further includes a second caliper fixing portion, and a third caliper fixing portion.

3. The brake actuator according to claim 2, wherein the second caliper fixing portion and the third caliper fixing portion are arranged on the same side as the accommodating portion in the support portion.

4. The brake actuator according to claim 3, wherein the second caliper fixing portion and the third caliper fixing portion are arranged near an outer circumferential wall portion of the case coupling the accommodating portion and the support portion to each other.

5. The brake actuator according to claim 1, wherein the caliper fixing portions are equiangularly arranged and centered around the output shaft.

6. The brake actuator according to claim 1, wherein
   an angle formed by the first straight line and the second straight line is the same as an angle formed by the first straight line and the third straight line,
   each of the angle formed by the first straight line and the second straight line and the angle formed by the first straight line and the third straight line is smaller than an angle formed by the second straight line and the third straight line.

7. The brake actuator according to claim 1, further comprising:
a cover made of resin material, wherein with the electric motor and the speed reduction mechanism accommodated in the case, an opening of the case is hermetically sealed with the cover.

8. The brake actuator according to claim 1, wherein
the first caliper fixing portion has a cylindrical fixing portion provided inside the caliper fixing portions in a radial direction thereof,
a plurality of ribs are radially extends from the cylindrical fixing portion to the caliper fixing portions.

9. The brake actuator according to claim 1, which is applied to a brake apparatus for a truck.

10. A brake apparatus having: a rotor; a pad pressed to the rotor; a piston which presses the pad; a caliper which movably holds the piston; and an actuator configured to drive the piston movably held by the caliper, formed as an element separated from the caliper, and attached to the caliper, the actuator comprising:
an electric motor having a rotation shaft;
an output shaft which transmits motive power of the electric motor to the piston;
a speed reduction mechanism provided between the rotation shaft and the output shaft;
a case in which the electric motor and the speed reduction mechanism are accommodated, the case being formed of resin material;
an accommodating portion provided to the case, the electric motor being accommodated in the accommodating portion, and
a support portion provided to the case, and arranged in side by side relationship with the accommodating portion in a direction crossing an axial direction of the accommodating portion to support the output shaft,
wherein the support portion has three or more caliper fixing portions fixed to the caliper, and arranged so as to surround the output shaft,
one of the caliper fixing portions is defined as a first caliper fixing portion,
the first caliper fixing portion is arranged on an extension line aligned with a straight line extending from the rotation shaft to the output shaft,
a first straight line extending from the first caliper fixing portion to the output shaft, a second straight line extending from a second caliper fixing portion to the output shaft, and a third straight line extending from a third caliper fixing portion to the output shaft are the same in length as each other.

11. The brake apparatus according to claim 10, wherein the support portion further includes a second caliper fixing portion, and a third caliper fixing portion.

12. The brake apparatus according to claim 11, wherein the second caliper fixing portion and the third caliper fixing portion are arranged on the same side as the accommodating portion in the support portion.

13. The brake apparatus according to claim 12, wherein the second caliper fixing portion and the third caliper fixing portion are arranged near an outer circumferential wall portion of the case coupling the accommodating portion and the support portion to each other.

14. The brake apparatus according to claim 10, wherein the caliper fixing portions are equiangularly arranged and centered around the output shaft.

* * * * *